United States Patent
Cammish et al.

(10) Patent No.: US 12,485,226 B2
(45) Date of Patent: Dec. 2, 2025

(54) PREFILLED SYRINGE AND METHOD OF STERILIZING A PREFILLED SYRINGE

(71) Applicant: F. HOFFMANN-LA ROCHE AG, Basel (CH)

(72) Inventors: Neil B. Cammish, Manchester (GB); Markus Hemminger, Basel (CH); Cyrille Blintz, Basel (CH); Mayumi Bowen, San Francisco, CA (US); Joshua Horvath, San Francisco, CA (US)

(73) Assignee: F. HOFFMANN-LA ROCHE AG, Basel (CH)

(*) Notice: Subject to any disclaimer, the term of this patent is extended or adjusted under 35 U.S.C. 154(b) by 1182 days.

(21) Appl. No.: 16/966,500

(22) PCT Filed: Feb. 1, 2019

(86) PCT No.: PCT/EP2019/052466
§ 371 (c)(1),
(2) Date: Jul. 31, 2020

(87) PCT Pub. No.: WO2019/149869
PCT Pub. Date: Aug. 8, 2019

(65) Prior Publication Data
US 2021/0052816 A1 Feb. 25, 2021

Related U.S. Application Data

(60) Provisional application No. 62/625,444, filed on Feb. 2, 2018.

(51) Int. Cl.
*A61M 5/315* (2006.01)
*A61M 5/31* (2006.01)

(52) U.S. Cl.
CPC ...... *A61M 5/31505* (2013.01); *A61M 5/3137* (2013.01); *A61M 5/31513* (2013.01);
(Continued)

(58) Field of Classification Search
CPC ............ A61M 5/31505; A61M 5/3137; A61M 5/31513; A61M 5/28; A61M 5/281;
(Continued)

(56) References Cited

U.S. PATENT DOCUMENTS

2011/0190709 A1* 8/2011 Mitsuno ................ A61M 5/001
604/181
2015/0105734 A1 4/2015 Bryant et al.
(Continued)

FOREIGN PATENT DOCUMENTS

EP 1488818 A1 12/2004
FR 2787719 A1 6/2000
(Continued)

OTHER PUBLICATIONS

PCT/EP2019/052466; International Search Report and Written Opinion of International Searching Authority issued Aug. 2, 2019.

*Primary Examiner* — Laura A Bouchelle
*Assistant Examiner* — Sarah Dympna Grasmeder
(74) *Attorney, Agent, or Firm* — MEDLER FERRO WOODHOUSE & MILLS PLLC

(57) ABSTRACT

A prefilled syringe is disclosed that includes a barrel, a stopper displaceable within and defining a sealed chamber in an interior of the barrel, a liquid filled in the chamber of the barrel, and a plunger extending within the barrel. The stopper expels the liquid out of the barrel via an orifice when being forwarded towards the orifice by the plunger such that a volume of the chamber is reduced. The plunger includes a proximal portion, a distal portion and a rod portion extending between the proximal portion and the distal portion. The
(Continued)

plunger is shaped to form a pathway between an opening of the barrel and a segment where the proximal portion of the plunger is neighboring the stopper such that a sterilizing agent can be provided through the opening of the barrel to the segment where the proximal portion of the plunger is neighboring the stopper.

20 Claims, 5 Drawing Sheets

(52) U.S. Cl.
CPC . *A61M 5/31515* (2013.01); *A61M 2005/3139* (2013.01); *A61M 2005/31508* (2013.01)

(58) Field of Classification Search
CPC .......... A61M 5/31515; A61M 5/31501; A61M 5/31511; A61M 5/315; A61M 2005/3139; A61M 2005/31508; A61M 2005/3117; A61M 2005/3121; A61M 2209/10

See application file for complete search history.

(56) References Cited

U.S. PATENT DOCUMENTS

| | | | |
|---|---|---|---|
| 2016/0325048 A1* | 11/2016 | Berry | A61M 5/31515 |
| 2017/0246396 A1* | 8/2017 | Wei | A61M 5/2033 |
| 2020/0170836 A1* | 6/2020 | Ricci | A61F 9/0008 |

FOREIGN PATENT DOCUMENTS

| | | |
|---|---|---|
| WO | 99/55402 A1 | 11/1999 |
| WO | 2014/005728 A1 | 1/2014 |
| WO | WO-2018215580 A1 * | 11/2018 |

* cited by examiner

PREFILLED SYRINGE AND METHOD OF STERILIZING A PREFILLED SYRINGE

TECHNICAL FIELD

The present invention relates to a prefilled syringe and more particularly to a method of sterilizing such a syringe.

Such prefilled syringes comprising (i) a barrel having a hollow interior, an orifice and an opening opposite to the orifice; (ii) a stopper arranged in the hollow interior of the barrel thereby defining a sealed chamber in the interior of the barrel, wherein the stopper is displaceable in the interior of the barrel thereby varying a volume of the chamber; (iii) a liquid within the chamber of the barrel; and (iv) a plunger extending through the opening of the barrel, can be used for providing a drug substance to a patient. In particular, it can allow for convenient administration of a predefined dose of the drug substance to the patient.

BACKGROUND ART

Many pharmaceutical products or drug substances are administered in liquid form. For an efficient administration and efficacy, the liquid drug substances is often delivered parenterally by injection. Thereby, particularly for subcutaneous, intramuscular, intradermal or intravitreal injection, the drug substance(s) are often provided in prefilled syringes (PFS). Such PFS may have staked needles or be capable of accepting a separate connecting needle. In a PFS, the drug substance(s) are provided in the interior of a barrel of the syringe in a solution, suspension or other liquid form ready for administration. A PFS may have the advantage that the user receives a (quasi) ready-to-inject syringe without requiring preparation such as having to fill the syringe with the drug substance, e.g. by transfer from a vial or the like. The contamination of the drug substance by e.g. particles and microbes, injuries, and/or inappropriate or inconvenient handling during application can thereby be reduced. Also, a PFS may allow self-administration by a patient.

Usually, a PFS comprises a barrel having an open end and a tip with an orifice essentially opposite to the open end, a rubber stopper, a plunger and a needle or needle adaptor on the orifice of the barrel. For example, a specific ophthalmic PFS is described in WO 2014/005728 A1.

Whereas, compared to conventional drug preparation, a PFS can be beneficial in use or administration, it is typically more challenging to manufacture drug substances in a PFS than in other containers such as vials. For example, preparation of a drug substance in a PFS can involve the following steps:

(i) Assembling the needle or needle adaptor on the tip of the barrel wherein a rubber element may tightly seal the orifice of the tip of the barrel for preventing loss of the drug substance and maintaining sterility.

(ii) Sterilizing the assembly of syringe barrel and needle or needle adaptor. Thereby, the assembly often is exposed to a sterilizing agent at well-defined conditions, such as sterilant concentration, temperature, duration, relative humidity and/or pressure, allowing a complete sterilization of the assembly even in between the rubber element and the tip of the syringe barrel. Frequently, ethylene oxide (EO) is used as a sterilizing agent.

(iii) After this first sterilization, the sterile drug substance is aseptically filled through the open end of the barrel into an interior of the barrel. Such aseptic filling typically is accomplished in cleanrooms in order to maintain sterility. Cleanrooms are often classified, e.g., by the standards defined as "Sterile Drug Products Produced By Aseptic Processing" or "Manufacture of Sterile Medicinal Products" by Good Manufacturing Practice (GMP) for Active Pharmaceutical Ingredients (API) issued by the International Conference on Harmonisation Regulations. For many parenteral drug substances such as ophthalmic drug substances for intravitreal injection, the cleanrooms must conform to the provisions for class A of the GMP standards.

(iv) After aseptically filling the drug substance, the interior of the syringe barrel is sealed by placing the sterile stopper through the open end of the barrel. This step typically is, again, accomplished aseptically in the cleanroom.

(v) The sealed assembly is then typically moved out of the cleanroom and assembled with the plunger. Thereby, the plunger is often forwarded through the open end of the barrel and can be coupled or not coupled to the stopper. In case of coupling, the stopper can be equipped with a cavity into which the plunger is, e.g., snapped or screwed in. In the same step, the sealed assembly may be provided with further elements such as an extended finger flange or the like.

(vi) Particularly, in ophthalmic applications, after being composed and eventually packaged, the external surface of the PFS is sterilized using gaseous chemical sterilization. Thereby, in order to prevent the drug inside the syringe barrel to be affected, it can be important to prevent that the sterilizing agent enters the sealed interior of the barrel. In particular, ingress of the sterilizing agent should be below the limit provided by health authorities or the International Organization for Standardization (ISO), or must not compromise the drug quality until end of shelf life. For example, in case EO is used as sterilization agent, the European Agency for the Evaluation of Medicinal Products (EMEA) specifies in EMEA/CVMP/271/01 guidance a limit of 1 μg/mL EO and 50 μg/mL ethylene chlorihydrin (ECH). Or, ISO10993-7 specifies a limit of 0.5 μg EO/IOL/24 hr and 1.25 μg EO/IOL, which interprets 0.5 μg EO/eye/24 hr and 1.25 μg EO/eye as well as 2.0 μg ECH/IOL/24 hr and 5.0 μg EO/IOL, which interprets 2.0 μg EO/eye/24 hr and 5.0 μg EO/eye.

A problem occurring in such external surface sterilization of PFS can be that the sterilizing agent is not capable of sufficiently reaching all parts and portions of the PFS other than the drug substance inside the barrel. In particular, accessing spaces and areas in the region of the plunger if coupled to the stopper is typically difficult. This may result in, at least, partially unsatisfying terminal or external surface sterilization of the PFS.

Another problem in external surface sterilization of a PFS can be induced by the conditions applied during sterilization processing. Typically, in sterilization the pressure is varied, such as often lowered, as well as other physical parameters such as temperature, humidity and the like. Such varying conditions and particularly varying pressure may cause the plunger together with the stopper to move to a certain extent since any gases in the PFS can change their volume when the external pressure changes during sterilization. Such movement involves the risk of breaching the sterility of the interior of the barrel such that contamination of the drug substance inside the barrel of the PFS may happen.

Therefore, there is a need for a system or prefilled syringe capable of being efficiently and securely externally surface sterilized.

DISCLOSURE OF THE INVENTION

According to the invention this need is settled by a prefilled syringe as it is defined by the features of the independent claims . Preferred embodiments are subject of the dependent claims.

In a first aspect, the invention is a prefilled syringe (PFS), which comprises: (i) a barrel having a hollow interior, an orifice and an opening opposite to the orifice; (ii) a stopper arranged in the hollow interior of the barrel thereby defining a sealed chamber in the interior of the barrel, wherein the stopper is displaceable in the interior of the barrel thereby varying a volume of the chamber; (iii) a liquid within the chamber of the barrel; and (iv) a plunger extending through the opening of the barrel. The stopper expels the liquid out of the barrel via the orifice when being moved towards the orifice by the plunger such that the volume of the chamber is reduced. The plunger comprises a proximal portion, a distal portion and a rod portion extending between the proximal portion and the distal portion. The plunger is shaped to form a pathway between the opening of the barrel and a segment where the proximal portion of the plunger is neighboring the stopper such that a sterilizing agent can be provided through the opening of the barrel to the segment where the proximal portion of the plunger is neighboring the stopper.

Preferably, the stopper has a cavity and the plunger is coupled to the stopper by the proximal portion of the plunger being provided into the cavity of the stopper such that the stopper is fitted on the proximal portion of the plunger. Thereby, the segment where the proximal portion of the plunger is neighboring the stopper preferably comprises the proximal portion of the plunger provided into the cavity of the stopper, and the pathway preferably extends between the opening of the barrel and the cavity of the stopper such that the sterilizing agent can be provided through the opening of the barrel into the cavity of the stopper.

In connection with the coupling of the stopper and the plunger, the term "fitted" can relate to a tight fitting or a clamping or any other mating connection such as screwing or the like.

The barrel of the PFS can have a main portion which is essentially cylindrical. Particularly, the main portion can have the shape of a hollow right circular cylinder. The barrel can be made of any suitable material and for most pharmaceutical applications of a sterilisable inert material such as an appropriate rigid plastic material or, particularly, glass. The opening of the barrel can particularly be an opening over the complete diameter of the interior of the barrel. The orifice can be embodied in a tip formed in the end of the barrel opposite to the opening. In particular, the orifice can be a channel in the tip having a reduced diameter compared to the diameter of the interior of the barrel. The orifice can be dimensioned to allow the liquid to be expelled when the volume of the chamber in the barrel is reduced by advancing the stopper via the plunger.

In the context of the present invention, the term "proximal" is used to refer to a portion, an extremity or a component located closest to or a direction oriented towards a medicament or drug delivery site, when the PFS is in use. Thus, the proximal direction can be a direction towards the body or person to which the PFS is intended to be applied. For example, in embodiments of prefilled syringes having a needle intended to be pierced in the body or person and the plunger to be pushed for delivering a medicament through the needle, the proximal end of the PFS is established by the tip of the needle. The proximal direction can be the direction towards an end of the needle or a location of the skin of the patient penetrated by the needle upon delivery of the medicament or drug substance to the patient.

Conversely, the term "distal" is used to refer to a portion, an extremity or a component located furthest away from or a direction oriented away from a medicament delivery site when the safety arrangement is in use. Thus, a distal direction can be a direction oriented away from a body or person to which the prefilled syringe would be applied. For example, in use, the distal end of the prefilled syringe can be the end of the plunger where a thumb of an operator is placed for forwarding the plunger in order to deliver the medicament.

The term "drug" as used herein relates to a therapeutically active agent, also commonly called active pharmaceutical ingredient (API), as well as to a combination or plurality of such therapeutically active substances. The term also encompasses diagnostic or imaging agents, like for example contrast agents such as MRI contrast agents, tracers such as PET tracers, and hormones, that need to be administered in liquid form to the patient.

The term "drug substance" as used herein relates to a drug as defined above formulated or reconstituted in a form that is suitable for administration to a patient. For example, besides the drug, a drug substance may additionally comprise an excipient and/or other auxiliary ingredients. A particularly preferred drug substance in the context of the invention is a drug solution, in particular a dug solution for injection.

Typically, the liquid inside the chamber of the syringe barrel is a drug substance. In case of a double chamber PFS one chamber may comprise the drug substance which has to be reconstituted for drug administration by a diluent which is contained in a second chamber. Alternatively the first and second chamber may contain two different drug substances which have to be mixed before drug administration. In particular, the syringe may house a specific dosage of the drug substance to be administered when being injected.

The term "drug product" as used herein relates to a finished end product comprising a drug substance or a plurality of drug substances. In particular, a drug product may be a ready to use product having the drug substance in an appropriate dosage and/or in an appropriate form for administration. For example, a drug product may include an administration device such as the PFS or the like.

The term "sterilizing agent" as used herein relates to any liquid, gaseous or vaporized substance capable for externally or external sterilizing the PFS surface. For example, the sterilizing agent can be or comprise ethylene oxide (EO), hydrogen peroxide ($H_2O_2$), steam, vaporized hydrogen peroxide (VHP), vaporized peracetic acid (VPA), or nitrogen dioxide.

Thereby, the term "sterilize" relates to bringing a structure or element such as the PFS in a sterile state. The term "sterile" as used herein relates to a maximum contamination rate allowing the PFS or another element to be used in an intended application. For example, it can relate to a state of the PFS conforming with the requirements and guidance according to the Standard ST67 of the American National Standards Institute (ANSI) and the Association for the Advancement of Medical Instrumentation (AAMI), i.e. to ANSI/AAMI ST67. More particularly, a sterility assurance level (SAL) value of $10^{-6}$ can be used for products to be labeled as sterile as specified in ANSI/AAMI ST67.

Thus, by means of the sterilizing agent or of the sterilization a situation free of any viable organisms can be achieved. In particular, sterilization can relate to a validated process used to render a product essentially free of viable organisms. In such a sterilization process, the increase of the microbiological death can be described by an exponential function. Therefore, the number of microorganisms which survive a sterilization process can be expressed in terms of probability.

The stopper or combination of stoppers may be made of an inert and resiliently deformable material such as rubber or silicone. In particular, it can be embodied to seal the chamber in the interior of the barrel containing fluid(s) or a solid and a fluid. Further, it can have a face oriented towards the liquid in the chamber and a face orientated to face in the distal direction. The outer circumference of the stopper can correspond to the inner circumference of the barrel when fitted. The cavity or recess of the stopper may be centrally positioned in order to receive the proximal portion of the plunger in a centralized fashion.

The PFS can have a central axis along which the barrel, the stopper and the plunger extend. The PFS or some parts of it such as the barrel can be rotational symmetric about the central axis.

By designing the plunger to form a pathway between the opening of the barrel and the segment where the proximal portion of the plunger is neighboring the stopper or, as the case may be, between the opening of the barrel and the cavity of the stopper, it can be achieved that a more complete external surface sterilization of the PFS is achieved, especially within its interior. In particular, it allows the sterilizing agent to move through the opening of the barrel to the segment where the proximal portion of the plunger is neighboring the stopper and, if present, into the cavity of the stopper such that the portions between the stopper and the plunger can also be efficiently sterilized. Like this, an efficient and secure external surface sterilization of the PFS can be provided.

Preferably, the plunger comprises a stopper contact section between the proximal portion and the rod portion, wherein the stopper contact section is equipped with at least one opening. Such a stopper contact section allows for providing a suitable transfer of a force from the plunger to the stopper. For example, such transfer may be aimed to be more or less uniform in order to prevent differential deformation of the stopper when forwarding it to expel the liquid. By providing the stopper contact section with an opening it can be achieved that on one hand a comparably uniform force transfer is achieved and on the other hand the area or zone between the stopper and the plunger as well as the cavity of the stopper can be reached by the sterilizing agent. This allows for ensuring an efficient and secure external surface sterilization.

Thereby, the at least one opening of the stopper contact section of the plunger preferably comprises a bore. Such a bore can be efficiently embodied and allows to centrally provide the sterilizing agent into the zone where or near the stopper contacts the plunger. The bore of the at least one opening of the stopper contact section of the plunger preferably is adjacent to the cavity of the stopper. Like this, the sterilizing agent can efficiently be forwarded into or to the cavity which allows for a comparably complete external surface sterilization.

Alternatively or additionally, the at least one opening of the stopper contact section of the plunger preferably comprises a peripheral indentation. Such indentation allows for providing the sterilizing agent peripherally behind the stopper contact section and, particularly in the zone between the plunger and the stopper.

Preferably, the stopper contact section of the plunger has a circumference essentially mating the interior of the barrel. Like this, the plunger can be securely guided when being moved axially such that a safe axial movement can be achieved. Also, it allows for uniformly transferring a force to the stopper when being advanced. Preferably, the stopper contact section of the plunger is essentially disk-shaped.

In particular, the stopper contact section of the plunger preferably contacts a distal end of the stopper. Thereby, the stopper contact section of the plunger preferably has a projection contacting the stopper. Such a projection allows for a uniform force transfer from the plunger to the stopper and, at the same time, to reduce the effective contact area where sterilization is difficult. Like this, an efficient and comparably complete sterilization can be achieved while still allowing a proper and accurate administration. For the same purpose, the stopper preferably has a bulge or annular rib or radial rib contacting the stopper contact section of the plunger.

Preferably, the proximal portion of the plunger has a stem proximally ending in a snap-in section which radially protrudes the stem. The stem and snap-in section can have an essentially T-shaped or arrow shaped axial cross section. With such a proximal portion the plunger can efficiently be coupled to the stopper. In particular, it can be coupled to the stopper by advancing the snap-in section into the cavity of the stopper until it tightly fits. Thereby, the snap-in section of the proximal portion of the plunger preferably tapers in a proximal direction. Such tapering snap-in section allows for efficiently introducing the proximal portion into the cavity of the stopper.

Preferably, the rod portion of the plunger comprises an essentially axial recess. Such recess or, particularly, plural such recesses may allow for an efficient implementation of the sterilizing agent pathway. Thereby, the at least one opening of the stopper contact section and the axial recess of the rod portion preferably are in fluid connection. Such connected recess and opening can efficiently provide an appropriate pathway allowing the sterilizing agent to move to and, in some cases, within the stopper as necessary.

The axial recess of the rod portion is preferably formed by a transversal cross section of the rod portion being essentially cruciform. The legs of the cricuform cross section can have identical dimensions. Like this, the plunger can be equipped with four recesses each of which being part of the pathway.

In a second aspect, the invention is a PFS comprising (i) a barrel having a hollow interior, an orifice and an opening opposite to the orifice; (ii) a stopper arranged in the hollow interior of the barrel thereby defining a sealed chamber in the interior of the barrel, wherein the stopper is displaceable in the interior of the barrel thereby varying a volume of the chamber; (iii) a liquid within the chamber of the barrel; and (iv) a plunger extending through the opening of the barrel. The stopper expels the liquid out of the barrel via the orifice when being moved towards the orifice by the plunger such that the volume of the chamber is reduced. The plunger comprises a proximal portion, a distal portion and a rod portion extending along an axis between the proximal portion and the distal portion. The barrel is equipped with a backstop structure. The rod portion of the plunger has a rigid axial section and a series of flexible arms projecting from the axial section. The arms of the series of flexible arms are inflected when arranged in the interior of the barrel. Each arm of the series of flexible arms ends at another position relative to the axis of the plunger. The backstop structure is arranged to abut the end of the arms of the series of flexible arms or at least one of them to prevent a movement of the plunger in a distal direction along its axis.

The term "position in relation to the axis of the plunger" as used herein is also referred to as axial position. Thereby, the axis of the plunger can be identical to the central axis of the PFS.

By each arm of the series of flexible arms ending at different axial positions a stepped blocking of a backward or distal movement of the plunger can be achieved. Like this, the blocking can be precisely implemented at comparably small steps or axial back movements. In other words, the tolerance of the blocking of the plunger's backward or distal movement can be kept comparably small.

The term "arm" as used in connection with the PFS of the second aspect of the invention relates to an elongated structure formed in the rod portion of the plunger. In a non-inclined position the arm can be essentially straight and bar- or rib-shaped. It can have a certain flexibility, i.e. resiliency or elasticity, in order to be deflectable, inflectable or capable of bending towards the axial section when being arranged within the barrel. The arm extends from the central axial section in a direction different from the axis of the PFS or of the plunger. Thereby, an angle between a longitudinal extension of the arm and the central axis of the PFS can be between about 10° and about 50°, between about 15° and about 45°, between about 20° and about 35° or between about 25° and about 30°, or it can be about 27°.

By inflecting the arms and thereby pre-tensioning them, it can be assured that the arms efficiently abut and interact with the backstop structure. For example compared to known backstop structures involving teeth or the like, the arms allow for improving the reliability and the strength of the backstop mechanism. Thus, a backward or distal movement of the plunger can efficiently be prevented. Like this, the PFS of the second aspect of the invention can efficiently and securely be external surface sterilized. In particular, the arrangement of arms and backstop structure can efficiently prevent any excessive movement of the stopper when the atmospheric pressure is lowered during external surface sterilization. Such prevention can be particularly important in comparably small volume PFS such as in ophthalmic syringes. Excessive movement may cause the stopper to move in a region that is not yet sterilized to a sufficient extent and increase the risk of breaching the interior of the barrel such that contamination of the drug substance inside the barrel of the PFS may occur.

Preferably, the series of flexible arms comprises a first group of at least one arm radially extending from the axial section in a first direction and a second group of at least one arm radially extending from the axial section in a second direction different from the first direction. Such arrangement of different groups of arms allows for providing comparably long arms which end a comparably small axial distance from each other. Like this, a beneficial resiliency and, thereby, a secure backward or distal movement prevention can be implemented while allowing and taking into account variations in stopper and plunger position. The first direction preferably is opposite to the second direction.

Furthermore, the series of flexible arms preferably comprises a third group of at least one arm radially extending from the axial section in a third direction essentially orthogonal to the first direction and a fourth group of at least one arm radially extending from the axial section in a fourth direction opposite the third direction. Such groups of arms circumferentially distributed about the axis of the plunger allow for providing a robust and finely stepped backward or distal movement blocking. The circumferential array of several groups of arms may have the additional benefit that the plunger can be assembled into the syringe barrel without having to orient the plunger about its central axis.

Preferably, the stopper of the PFS of the second aspect of the invention has plural axially spaced sealing sections which are tightly connected to the barrel or pressed onto the inner wall of the barrel, and a smallest distance between ends of the arms of the series of flexible arms along the axis of the plunger is smaller than an axial distance between two neighbouring sealing sections of the stopper that are essential for maintaining sterility of the liquid within the chamber of the barrel. The sealing sections of the stopper can be circumferential ribs or rings. For example, when the barrel of the PFS has a nominal fill volume of 1.0 ml or less, the stopper can be equipped with three ribs which may be spaced by about 1.5 mm. Such a stopper having a plurality of sealing sections may define a sterility zone wherein the specified axial distance between neighbouring arm ends is smaller than the sterility zone such that the risk for loss of sterility of the syringe content, e.g. the liquid, can be reduced. The number and position of sealing sections may be chosen taking into account the total friction induced by the sum of these sections limiting the maximum distance the stopper could potentially move.

Advantageously, the friction between the stopper and an inner wall of the syringe barrel is low in order to minimize the force to expel the syringe content by the user. For reducing the friction, the stopper and/or the interior of the syringe barrel may be treated with a low friction coating such as silicone oil and Polytetrafluoroethylene (PTFE).

Preferably, the backstop structure is integral with or preassembled on the barrel. Thereby, it preferably comprises a protrusion extending, e.g. radially, towards the plunger. Such a protrusion may efficiently interact with the arms. It may be shaped as one or a plurality of teeth or keys within keyways and can also extend over the complete internal circumference of the barrel. Like this, an efficient backstop mechanism can be implemented.

Alternatively or additionally, the PFS of the second aspect of the invention preferably comprises a backstop element having the backstop structure, wherein the backstop element is mounted to a distal end of barrel. Thereby, the backstop structure of the backstop element preferably has a protrusion extending, e.g. radially, towards the plunger. Also, here, such a protrusion may efficiently interact with the arms. It may be shaped as one or a plurality of teeth or keys within keyways and can also extend over the complete internal circumference of the barrel. Like this, an efficient backstop mechanism can be implemented which, as the need may be, can be removed before drug product administration.

The backstop element preferably is an extended finger flange. The barrel preferably has a flange section at its opening and the backstop element preferably is mounted to the flange section of the barrel. Like this, the backstop element can be efficiently embodied or mounted and a convenient handling of the PFS can be achieved.

In a third aspect, the invention is a prefilled syringe comprising (i) a barrel having a hollow interior, an orifice and an opening opposite to the orifice; (ii) a stopper arranged in the hollow interior of the barrel thereby defining a sealed chamber in the interior of the barrel, wherein the stopper is displaceable in the interior of the barrel thereby varying a volume of the chamber; (iii) a liquid within the chamber of the barrel; and (iv) a plunger extending through the opening of the barrel. The stopper expels the liquid out of the barrel via the orifice when being moved towards the orifice by the plunger such that the volume of the chamber is reduced. The plunger comprises a proximal portion, a distal portion and a rod portion extending along an axis between the proximal portion and the distal portion. The barrel is equipped with a backstop structure. The rod portion of the plunger has a rigid axial section and a series of flexible arms projecting from the axial section. The arms of the series of flexible arms are inflected when arranged in the interior of the barrel each arm of the series of flexible arms ends at another position in relation to the axis of the plunger, and the backstop structure is arranged to abut the end of the arms of the series of flexible arms to prevent a movement of the plunger along its axis in a distal direction. The plunger is shaped to form a pathway between the opening of the barrel and a segment where the proximal portion of the plunger is neighboring the stopper such that a sterilizing agent can be provided through the opening of the barrel to the segment where the proximal portion of the plunger is neighboring the stopper.

Thus, the PFS of the third aspect of the invention combines the sterilizing agent access features of the PFS of the first aspect of the invention with the plunger backstop mechanism of the PFS of the second aspect of the invention. Such combination allows for providing a particularly advantageous external surface sterilization of the PFS in which a comparably complete sterilization is achieved as well as preventing potential loss of sterility due to stopper excessive movement.

The PFS of the third aspect of the invention can be combined with any additional features mentioned above in connection with the PFS of the first aspect of the invention and the PFS of the second aspect of the invention. Like this, the additional affects and benefits related to the preferred embodiments described above can be achieved.

The following preferred features can be implemented in any of the PFS of the first, second and third aspects of the invention.

The distal portion of the plunger preferably comprises an extended finger rest surface. Such surface or finger pad at the back end of the plunger allows for conveniently applying a suitable manual force to the plunger such that it forwards the stopper and expels the liquid out of the orifice of the barrel.

The barrel preferably has a nominal fill volume of about 2.25 milliliters (ml) or less, of about 1.0 ml or less, or of about 0.5 ml or less. In such comparably small volume syringes the effects achieved by the inventive features can be particularly advantageous.

The liquid preferably comprises a drug substance. In particular, the drug substance can be for an ophthalmic application, i.e., it can be an ophthalmic drug substance.

Preferably, the barrel is made of glass or a thermoplastic polymer, such as a cycloolefin copolymer (COC) or a cycloolefin polymer (COP). Barrels manufactured from such materials can ensure a desired robustness, inertness and low gas permeability. Therefore, they allow for a convenient handling and a long-term storage which can be preferred for many pharmaceutical or drug products.

The plunger is preferably made of a thermoplastic polymer such as polypropylene. Such a plunger can efficiently be manufactured, e.g. by injection molding, and allows for providing appropriate characteristics.

The stopper preferably is made of a natural rubber material, a synthetic rubber such as a thermoplastic elastomer, or silicone.

The orifice of the syringe barrel is preferably equipped with a needle adaptor. Such adaptor allows for mounting an appropriate needle shortly before administration of the PFS. Like this, handling of the PFS can be comparably convenient.

Thereby, a seal, e.g., made of rubber or the same material as the stopper, can be provided between the needle adaptor and the orifice of the barrel. Like this, the orifice can efficiently be sealed and contamination of the liquid via the orifice can be prevented.

In a fourth aspect, the invention is a method of sterilizing a prefilled syringe. The method comprises (i) obtaining any PFS as described above, providing a sterilizing agent to the prefilled syringe at a predefined temperature and a predefined pressure, and providing a cleaning agent to the prefilled syringe. The cleaning agent can, e.g., be purified water and allows for removing any residuals of the sterilizing agent.

The method according to the invention allows for efficiently achieving the effects and benefits described above with the different embodiments of PFS.

BRIEF DESCRIPTION OF THE DRAWINGS

The prefilled syringes (PFS) according to the invention and the method according to the invention are described in more detail hereinbelow by way of an exemplary embodiment and with reference to the attached drawings, in which.

DESCRIPTION OF EMBODIMENTS

In the following description, certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect.

Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
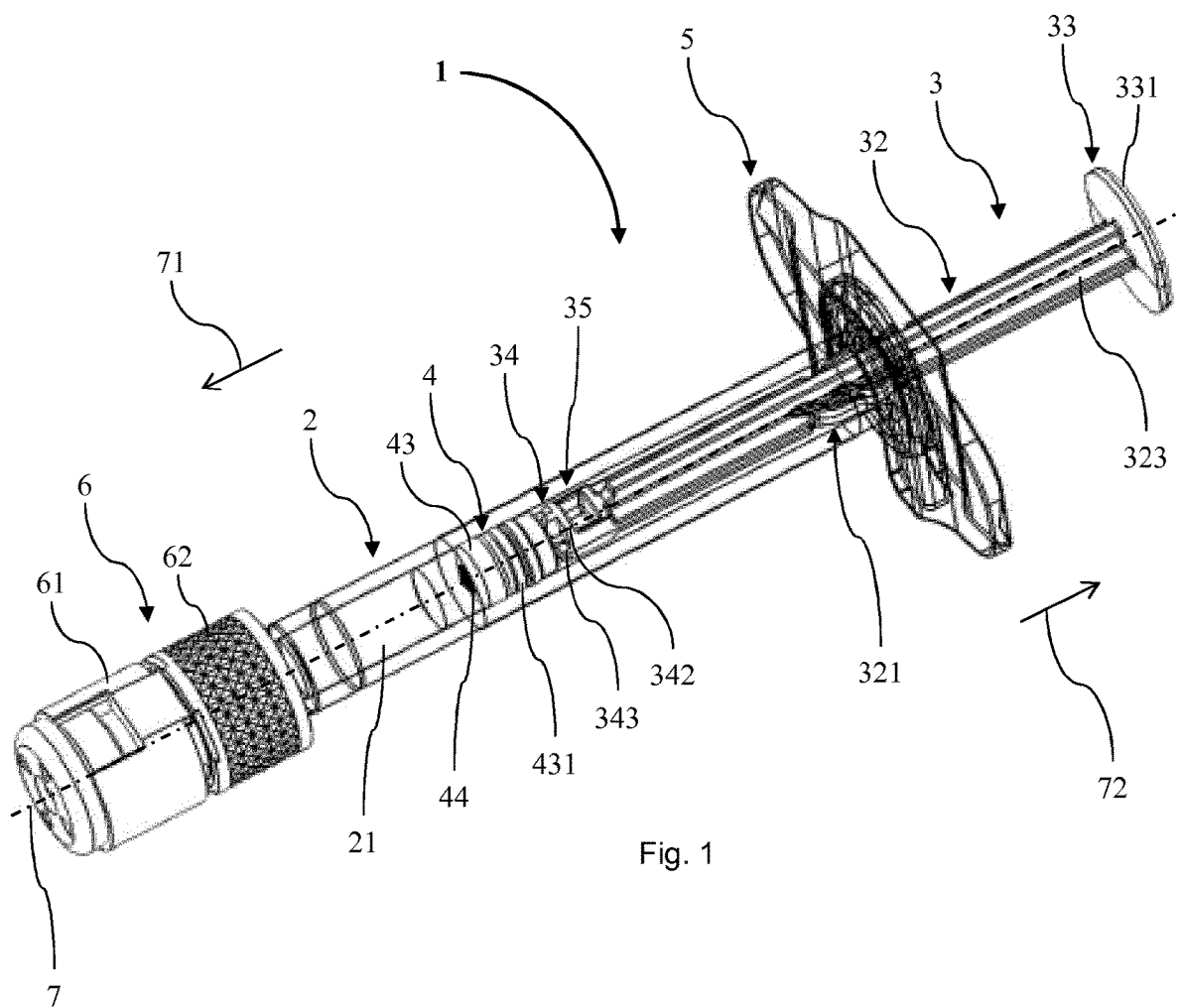
FIG. 1 shows a perspective view of an embodiment of a PFS according to the invention.

FIG. 1 shows an embodiment of a prefilled syringe (PFS) 1 according to the first aspect of the invention, according to the second aspect of the invention and according to the third aspect of the invention. The PFS 1 extends along a longitudinal axis 7 and comprises a glass barrel 2 having a hollow interior, a left-hand or proximal orifice and a right-hand or distal opening. A stopper 4 is pushed through the opening of the barrel 2 such that it is arranged inside the barrel 2. The stopper 4 defines a sealed chamber 21 inside the barrel 2, wherein the chamber 21 is formed between a proximal face 44 of the stopper 4 and the orifice of the barrel 2. The stopper 4 is displaceable in the interior of the barrel 2 thereby varying a volume of the chamber 21. In the chamber 21 a liquid drug substance is filled. When being moved towards the orifice of the barrel 2, the volume of the chamber 21 is reduced and, starting at a certain point, the stopper 4 expels the drug out of the orifice.

The stopper 4 is coupled to a plunger 3 which distally extends from the stopper 4 through the opening of the barrel 2. About a distal end of the barrel 2 where its opening is, a finger flange 5 is mounted as backstop element. The orifice of the barrel 2 is connected to a needle adaptor 6. The needle adaptor 6 has a coupling piece 62 which is formed as a male part of a so-called Luer-Lock connecting system. The coupling piece 62 is covered by a cap 61 of the needle adaptor 6.

Figure 2:
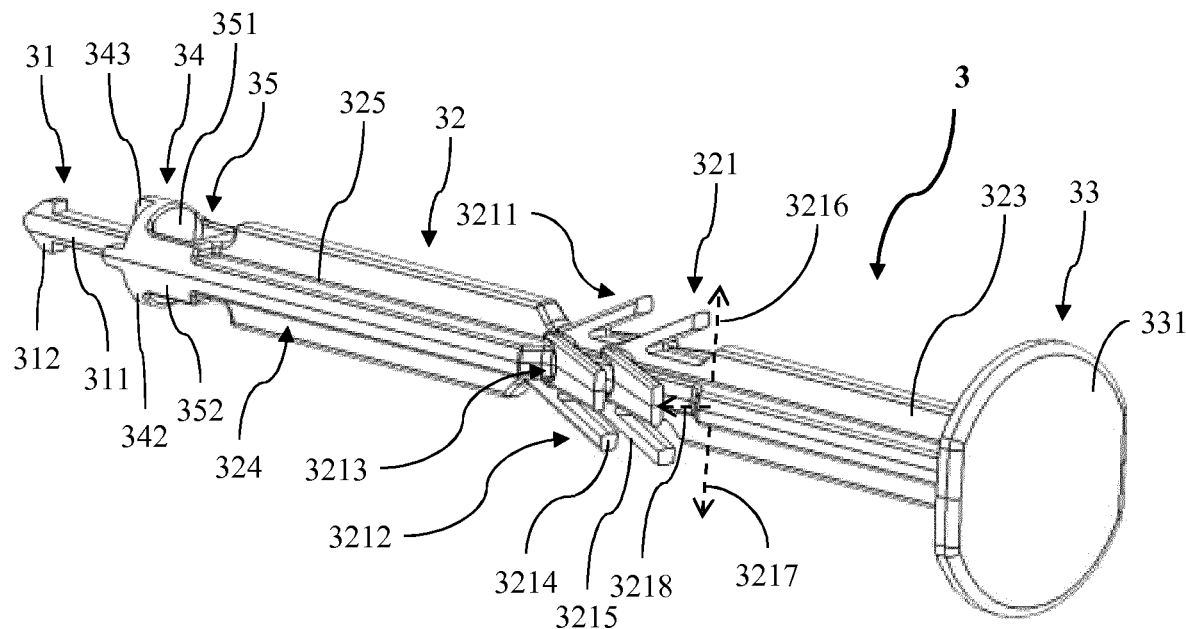
FIG. 2 shows a perspective back view of a plunger of the PFS of FIG. 1.

As can be seen in FIG. 2, the plunger 3 comprises a proximal portion 31, a distal portion 33 and a rod portion 32 extending between the proximal portion 31 and the distal portion 33. Between the rod portion 32 and the proximal portion 31 a stopper contact section 34 is arranged which is connected to the rod portion 32 via a transition section 35.

The distal portion 33 of the plunger 3 forms an extended finger rest surface 331 which is shaped to receive a finger of a practitioner applying the PFS 1. The rod portion 32 of the plunger 3 comprises a rigid axial section 325 extending all along the rod portion 32, and a series of flexible arms 321 projecting from the axial section 325.

The series of arms 321 has a first group arms 3211 extending from the axial section 325 in a radial first direction 3216, a second group arms 3212 extending from the axial section 325 in a radial second direction 3217 opposite to the first direction 3216, a third group arms 3213 extending from the axial section 325 in a radial third direction 3218 orthogonal to the first direction 3216 and a fourth group of arms extending from the axial section 325 in a fourth direction opposite the third direction 3218. Each of the first to fourth groups of arms, 3211, 3212, 3213 has two axially spaced arms 321.

Each arm 321 has an elongated rib portion 3215 with an open end 3214 essentially facing into a distal direction 72. Further, the ends 3214 of all arms 321 are axially displaced relative to each other such that all ends 3214 located at a different axial position of the rod portion 32 or at another position in relation to the axis 7 of the PFS 7 or plunger 3.

The rod portion 32 further has longitudinal ribs 323 extending from the arms 321 in the proximal direction and the distal direction 72. In particular, each longitudinal rib 323 is in line with one of the group of arms 3211, 3212, 3213 such that they stand in the first direction 3216, the second direction 3217, the third direction 3218 or the fourth direction from the axial section 325. Each two circumferentially neighbouring longitudinal ribs 323 are at an angle of 90° and form a longitudinal recess 324 such that four recesses 324 are arranged about the rod portion 32 of the plunger 3. In a cross section, the four longitudinal ribs 323 together with the axial section 325 form a cross.

The stopper contact section 34 has a disk 342 matching to the internal circumference of the barrel 2. The disk 342 is connected to the rod portion 32 by two opposite side walls 352 of the transition section 35. Between the side walls 352 the transition section forms a stirrup opening 351.

The proximal portion 31 of the plunger 3 has an axial stem 311 proximally ending in an arrow head 312 as snap-in section. The stem 311 and the arrow head 312 together have a shape of an arrow. In a proximal direction 71 the arrow head 312 is tapering such that it forms a tip.

Figure 3:
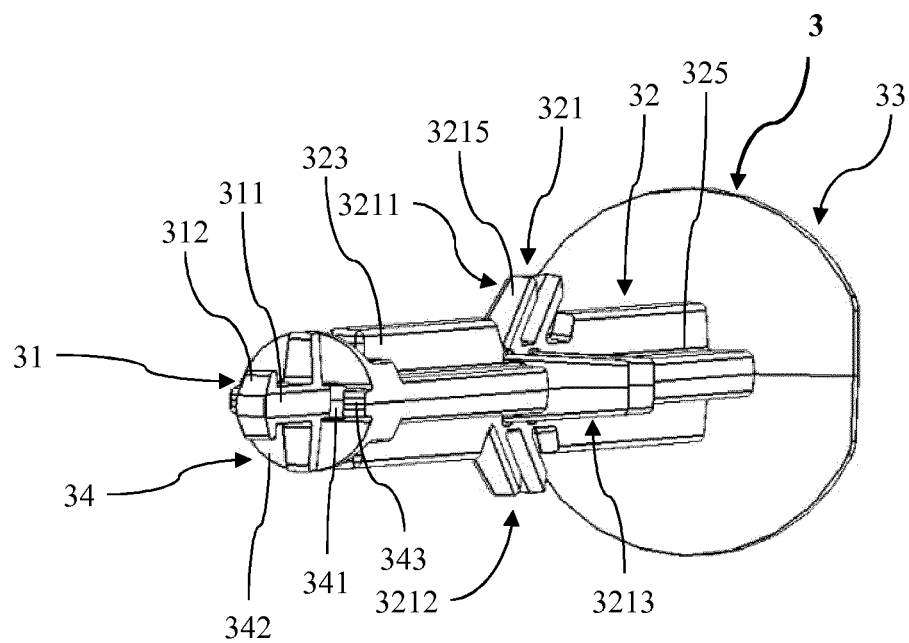
FIG. 3 shows a perspective front view of the plunger of the PFS of FIG. 1.

FIG. 3 shows the plunger 3 from a front side or proximal end. There, it is visible that the disk 342 of the stopper contact section 34 is provided with two bores 341 as openings connecting the proximal portion 31 with the stirrup opening 351 of the transition section 35. Further, the disk 342 is equipped with four projections 343 extending in the proximal direction 71. More specifically, the four projections 343 are arranged as the four legs of a cross, wherein two of them are interrupted by the bores 341.

Figure 4:
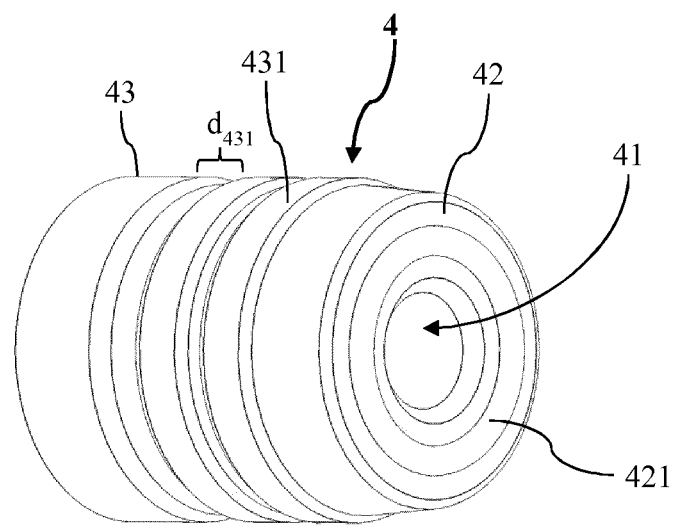
FIG. 4 shows a perspective view of a stopper of the PFS of FIG. 1.

In FIG. 4 the stopper 4 is shown in more detail. It is made of a rubber or rubber-like material and has an essentially cylindrical shape matching the interior of the barrel 2. In its interior, the stopper 4 has a cavity 41 which is open towards a distal face 42 of the stopper 4. The distal face 42 is equipped with a semi toroidal rib 421 or bulge extending into the distal direction 72. A circumference 43 of the plunger 4 is provided with three ring shaped sealing sections 431 which have a larger outer diameter than the rest of the circumference 43. The sealing sections 431 are axially spaced from each other by an axial seal distance $d_{431}$.

Figure 5:
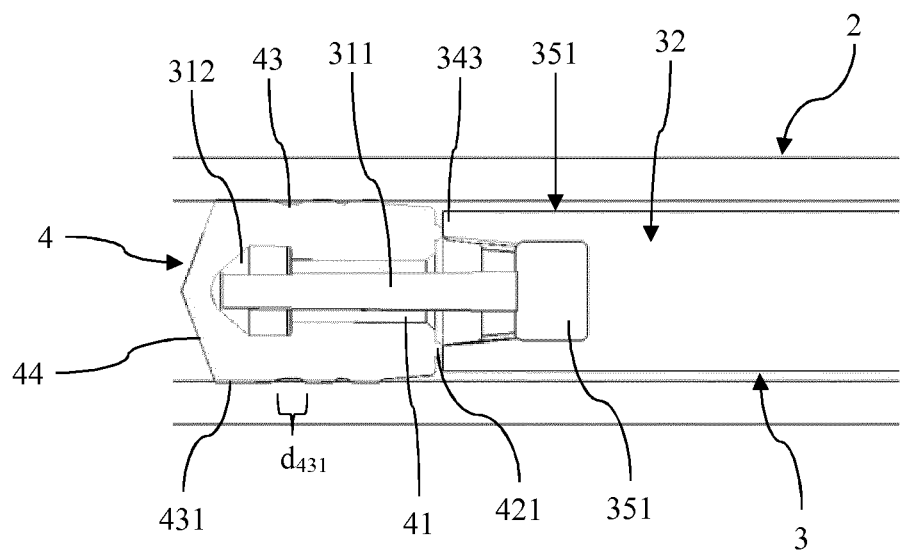
FIG. 5 shows a cross sectional view of a portion the PFS of FIG. 1 where the stopper is coupled to the plunger.

As can be best seen in FIG. 5 the stopper 4 is coupled to the plunger 3 by advancing the proximal portion 31 into the cavity 41. The cavity 41 is shaped in correspondence to the proximal portion 31 such that these two elements provide a tight fit. Thereby, the stopper 4 is fixed to the plunger 3.

The sealing sections 431 of the stopper 4 are pressed from the inside against the barrel 2 such that they are slightly compressed. Thereby, a liquid and to a certain extent gas tight connection is established which allows for securing the drug substance in the chamber 21 of the barrel 2.

Figure 6:
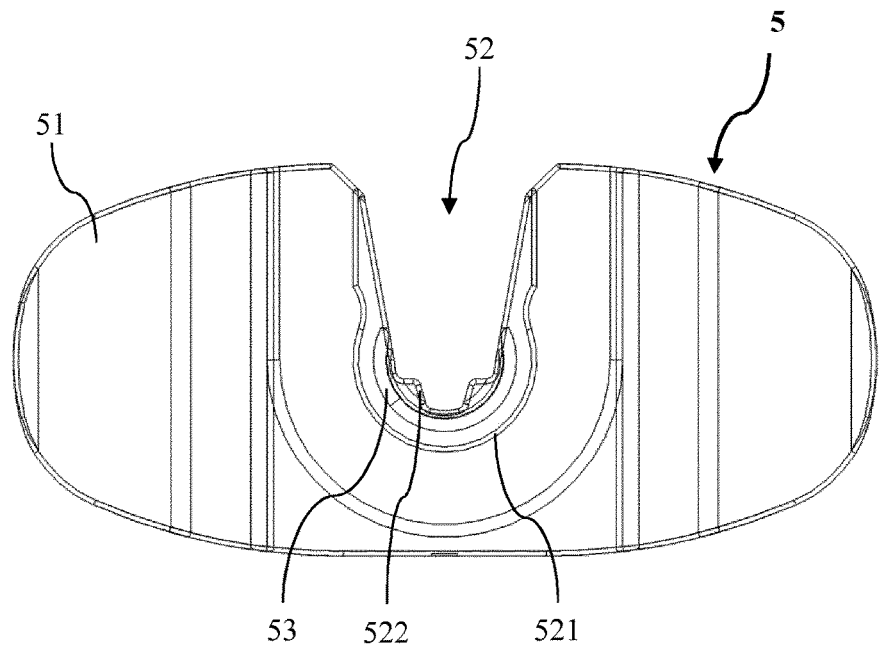
FIG. 6 shows a bottom view of an extended finger flange of the PFS of FIG. 1.

FIG. 6 shows the extended finger flange 5 from its proximal side 51 having an essentially oval basic shape. Top down there is a recess 52 provided in finger flange 5. The recess 52 has a proximal barrel clip contour 521 and a distal rod guiding contour 522. The barrel clip contour 521 is shaped corresponding to the outer circumference of the barrel 2. In particular, it has a portion shaped as a section of a circle which can be mated around the barrel 2. Thereby, the finger flange 5 can be clipped on the barrel 2 such that the opening thereof is positioned in between the barrel clip contour 521 and the rod guiding contour 522.

The rod guiding contour 522 of the recess 52 is formed to fit to the shape of the rod portion 32 of the plunger 3. In particular, when the finger flange 5 is clipped on the barrel 2, the rod portion 32 extends through and is held by the rod guiding contour 522 such that a rotation of the plunger 3 about the axis 7 is prevented.

In between the rod guiding contour 522 and the barrel clip contour 521 an abutting protrusion 53 is arranged as backstop structure. The abutting protrusion 53 has a shape of a ring section and is dimensioned to abut the ends 3214 of the arms 321 of to prevent a movement of the plunger 3 along its axis 7 in the distal direction 72.

Figure 7:
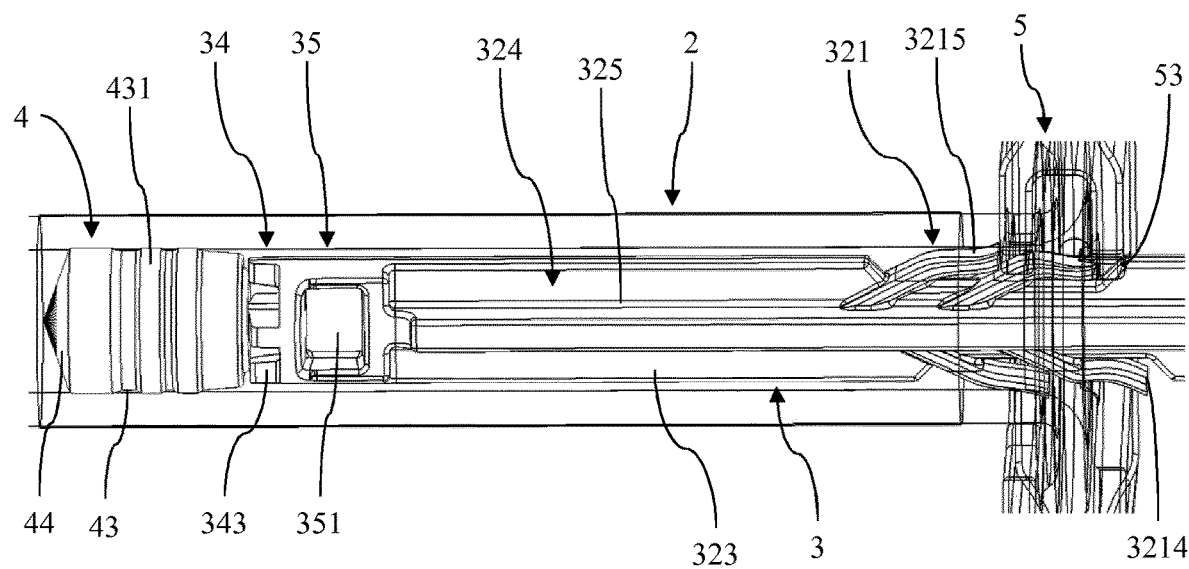
FIG. 7 shows a side view of a portion of the PFS of FIG. 1.

In FIG. 7 a portion of the PFS 1 is shown in more detail. The arms 321 of the rod portion 32 of the plunger 3 are arranged inside the barrel 2. Thereby, when being arranged in the interior of the barrel 2, they are inflected, i.e. bent towards the axial section 325. Like this, the arms 321 are pre-tensioned. Each arm 321 ends at another position in relation to the axis 7. More specifically, first the ends 3214 of the distal arms 321 of each group of arms 3211, 3212, 3213 are stepwise axially spaced and then the ends 3214 of the proximal arms 321 of each group of arms 3211, 3212, 3213 are stepwise axially spaced. Thus, each end 3214 of the eight arms is located at another position along the axis 7 such that eight axial steps are provided. A smallest distance between two ends 3214 of the arms 321 along the axis 7 is smaller than the seal distance $d_{431}$.

The abutting protrusion 53 of the finger flange 5 contacts one of the ends 3214 of the arm 321 and prevents that the plunger 3 is moved in the distal direction 72. Since the smallest distance between two ends 3214 of the arms 321 along the axis 7 is smaller than the seal distance $d_{431}$, the maximum movement of the plunger is also smaller than the seal distance $d_{431}$. Like this, it can be assured that no contaminating substance can reach behind the stopper 4 such that the drug substance inside the chamber 21 is protected.

Figure 8:
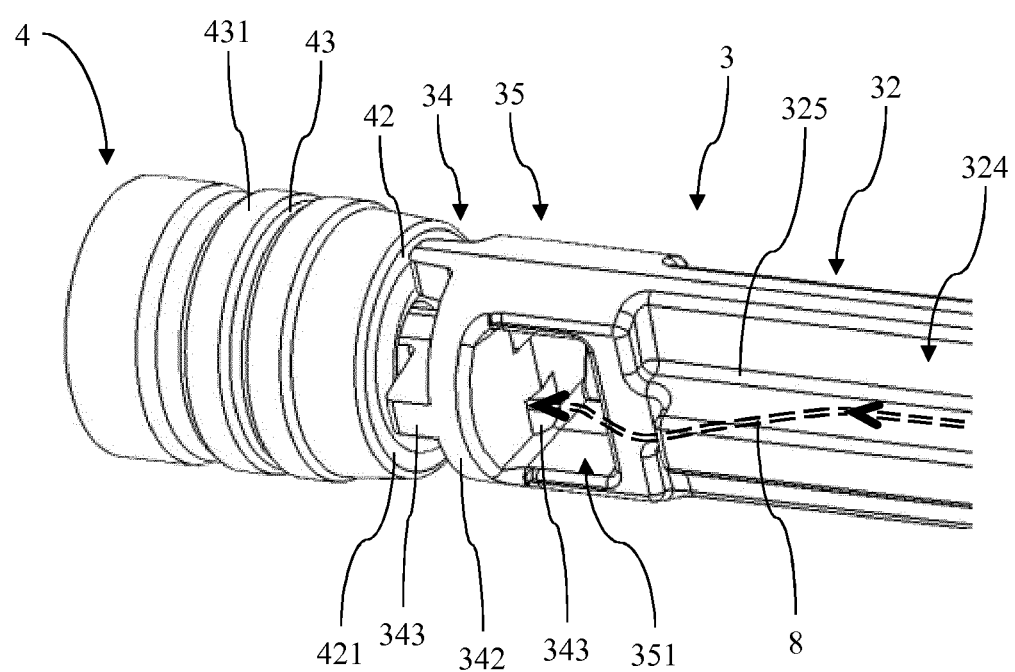
FIG. 8 shows perspective view of a portion of the plunger and the stopper of the PFS of FIG. 1.

Turning to FIG. 8 it can be seen that the axial recesses 324 of the rod portion 32 form a pathway 8 which proceed from the recesses through the stirrup opening 351 of the transition section 35 and the bores 343 of the stopper contact section 34 towards the cavity 41 of the stopper 4. This allows for providing a sterilizing agent from the opening of the barrel 2 to the cavity 41 such that a comparably complete external surface sterilization of the PFS 1 can be achieved.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A prefilled syringe comprising:
   a barrel having a hollow interior, an orifice, and an opening opposite to the orifice;
   a stopper arranged in the hollow interior of the barrel thereby defining a sealed chamber in the interior of the barrel, wherein the stopper is displaceable in the interior of the barrel thereby varying a volume of the chamber;
   a liquid within the chamber of the barrel; and
   a plunger extending through the opening of the barrel, wherein
      the stopper expels the liquid out of the barrel via the orifice when being moved towards the orifice by the plunger such that the volume of the chamber is reduced,
      the plunger comprises a proximal portion, a distal portion and a rod portion extending between the proximal portion and the distal portion, and
      the plunger is shaped to form a pathway between the opening of the barrel and a segment where the proximal portion of the plunger is neighboring the stopper such that a sterilizing agent can be provided through the opening of the barrel to the segment where the proximal portion of the plunger is neighboring the stopper,
   wherein the plunger comprises a stopper contact section between the proximal portion and the rod portion, and the stopper contact section is equipped with at least one opening, and
   wherein, to reduce an effective contact between the plunger and the stopper, the stopper contact section of the plunger has a projection contacting the stopper and/or the stopper has a bulge contacting the stopper contact section of the plunger, such that the sterilizing agent provided through the opening of the barrel can reach a zone between the stopper and the plunger.

2. The prefilled syringe of claim 1, wherein the stopper has a cavity and the plunger is coupled to the stopper by the proximal portion of the plunger being provided into the cavity of the stopper such that the stopper is fitted on the proximal portion of the plunger.

3. The prefilled syringe of claim 2, wherein the segment where the proximal portion of the plunger is neighboring the stopper comprises the proximal portion of the plunger provided into the cavity of the stopper, and the pathway extends between the opening of the barrel and the cavity of the stopper such that the sterilizing agent can be provided through the opening of the barrel into the cavity of the stopper.

4. The prefilled syringe of claim 1, wherein the at least one opening of the stopper contact section of the plunger comprises a bore.

5. The prefilled syringe of claim 4, wherein the at least one opening of the stopper contact section of the plunger comprises a peripheral indentation.

6. The prefilled syringe of claim 4, wherein the stopper contact section of the plunger has a circumference essentially mating the interior of the barrel.

7. The prefilled syringe of claim 4, wherein the stopper contact section of the plunger is essentially disk-shaped.

8. The prefilled syringe of claim 1, wherein the proximal portion of the plunger has a stem proximally ending in a snap-in section which radially protrudes from the stem.

9. The prefilled syringe of claim 1, wherein the rod portion of the plunger comprises an essentially axial recess.

10. The prefilled syringe of claim 4, wherein the at least one opening of the stopper contact section and an axial recess of the rod portion are in fluid connection.

11. The prefilled syringe of claim 1, wherein
the distal portion of the plunger comprises an extended finger rest surface, and/or
the barrel has a nominal fill volume of about 2.25 milliliters or less, of about 1.0 milliliters or less, or of about 0.5 milliliters or less, and/or
the liquid comprises a drug substance, and/or
the barrel is made of glass, and/or
the plunger is made of a thermoplastic polymer such as polypropylene, and/or
the stopper is made of a rubber material or silicone.

12. A method of sterilizing a prefilled syringe, comprising:
obtaining a prefilled syringe of claim 1;
providing a sterilizing agent to the prefilled syringe at a predefined temperature and a predefined pressure; and
providing a cleaning agent to the prefilled syringe.

13. The prefilled syringe of claim 2, wherein the at least one opening of the stopper contact section of the plunger comprises a bore and wherein the bore of the at least one opening of the stopper contact section of the plunger is adjacent to the cavity of the stopper.

14. The prefilled syringe of claim 8, wherein the snap-in section of the proximal portion of the plunger tapers in a proximal direction.

15. The prefilled syringe of claim 9, wherein the axial recess of the rod portion is formed by a transversal cross section of the rod portion being essentially cross shaped.

16. The prefilled syringe of claim 10, wherein the axial recess of the rod portion is formed by a transversal cross section of the rod portion being essentially cross shaped.

17. A prefilled syringe comprising:
a barrel having a hollow interior, an orifice, and an opening opposite to the orifice;
a stopper arranged in the hollow interior of the barrel thereby defining a sealed chamber in the interior of the barrel, wherein the stopper is displaceable in the interior of the barrel thereby varying a volume of the chamber;
a liquid within the chamber of the barrel; and
a plunger extending through the opening of the barrel, wherein
the stopper expels the liquid out of the barrel via the orifice when being moved towards the orifice by the plunger such that the volume of the chamber is reduced,
the plunger comprises a proximal portion, a distal portion and a rod portion extending between the proximal portion and the distal portion, and
the plunger is shaped to form a pathway between the opening of the barrel and a segment where the proximal portion of the plunger is neighboring the stopper such that a sterilizing agent can be provided through the opening of the barrel to the segment where the proximal portion of the plunger is neighboring the stopper,
wherein the plunger comprises a stopper contact section between the proximal portion and the rod portion, and the stopper contact section is equipped with at least one opening comprising a bore,
wherein the stopper has a cavity and the plunger is coupled to the stopper by the proximal portion of the plunger being provided into the cavity of the stopper such that the stopper is fitted on the proximal portion of the plunger, and
wherein the bore of the at least one opening of the stopper contact section of the plunger is adjacent to the cavity of the stopper such that the sterilizing agent provided through the opening of the barrel can forward into the cavity of the stopper.

18. The prefilled syringe of claim 17, wherein the stopper contact section of the plunger has a circumference essentially mating the interior of the barrel.

19. The prefilled syringe of claim 17, wherein the stopper contact section of the plunger is essentially disk-shaped.

20. A method of sterilizing a prefilled syringe, comprising:
a step of obtaining a prefilled syringe comprising
a barrel having a hollow interior, an orifice, and an opening opposite to the orifice;
a stopper arranged in the hollow interior of the barrel thereby defining a sealed chamber in the interior of the barrel, wherein the stopper is displaceable in the interior of the barrel thereby varying a volume of the chamber;
a liquid within the chamber of the barrel; and
a plunger extending through the opening of the barrel, wherein
the stopper expels the liquid out of the barrel via the orifice when being moved towards the orifice by the plunger such that the volume of the chamber is reduced,
the plunger comprises a proximal portion, a distal portion and a rod portion extending between the proximal portion and the distal portion, and
the plunger is shaped to form a pathway between the opening of the barrel and a segment where the proximal portion of the plunger is neighboring the stopper such that a sterilizing agent can be provided through the opening of the barrel to the segment where the proximal portion of the plunger is neighboring the stopper,
wherein the plunger comprises a stopper contact section between the proximal portion and the rod portion, and the stopper contact section is equipped with at least one opening comprising a bore, and a step of forwarding a sterilizing agent into a zone where the stopper contacts the plunger.

\* \* \* \* \*